(12) United States Patent
Smythe et al.

(10) Patent No.: US 9,581,437 B2
(45) Date of Patent: Feb. 28, 2017

(54) INTERFEROMETRIC NON-CONTACT OPTICAL PROBE AND MEASUREMENT

(71) Applicants: Robert Smythe, Middletown, CT (US); Artur Olszak, Tucson, AZ (US); Piotr Szwaykowski, Tucson, AZ (US)

(72) Inventors: Robert Smythe, Middletown, CT (US); Artur Olszak, Tucson, AZ (US); Piotr Szwaykowski, Tucson, AZ (US)

(73) Assignee: APRE INSTRUMENTS, LLC, Tucson, AZ (US)

( * ) Notice: Subject to any disclaimer, the term of this patent is extended or adjusted under 35 U.S.C. 154(b) by 0 days.

(21) Appl. No.: 14/956,355

(22) Filed: Dec. 1, 2015

(65) Prior Publication Data

US 2016/0091299 A1 Mar. 31, 2016

Related U.S. Application Data

(63) Continuation-in-part of application No. 14/834,727, filed on Aug. 25, 2015, which is a continuation-in-part of application No. 14/832,052, filed on Aug. 21, 2015.

(60) Provisional application No. 62/087,677, filed on Dec. 4, 2014, provisional application No. 62/044,009, filed on Aug. 29, 2014.

(51) Int. Cl.
G01B 9/02 (2006.01)
G01B 11/24 (2006.01)
G01B 11/00 (2006.01)

(52) U.S. Cl.
CPC ........ G01B 11/2441 (2013.01); G01B 9/0209 (2013.01); G01B 9/02038 (2013.01); G01B 9/02057 (2013.01); G01B 11/007 (2013.01)

(58) Field of Classification Search
CPC ............ G01B 9/02034; G01B 9/02038; G01B 9/02039; G01B 9/02057
USPC .................................................. 356/512, 516
See application file for complete search history.

(56) References Cited

U.S. PATENT DOCUMENTS

| 4,696,572 A | * | 9/1987 | Ono | ..................... G01B 11/255 356/458 |
| 2003/0011784 A1 | * | 1/2003 | De Groot | ........... G01B 11/2441 356/512 |

* cited by examiner

Primary Examiner — Jonathan Hansen
(74) Attorney, Agent, or Firm — Antonio R. Durando (57) ABSTRACT

A non-contact optical probe utilizes an optical reference surface that projects a curved test wavefront toward the test surface and detects it by creating curved interferometric fringes localized in space in front of the reference surface. When a point to be measured on the test surface intersects the location of the fringes, the condition is detected by the probe. Because the fringes are localized at a known position in space with respect to a reference system, the precise coordinate of the surface point can be established. Such localized fringes are preferably produced by a spectrally controllable light source. The curvature of the fringes ensures a sufficiently large angle of acceptance for the probe to capture light reflected from points of high surface slope. The probe is particularly suitable for coordinate measurement machines.

20 Claims, 5 Drawing Sheets

INTERFEROMETRIC NON-CONTACT OPTICAL PROBE AND MEASUREMENT

RELATED APPLICATIONS

This application is based on and claims the priority of U.S. Provisional Application No. 62/087,677, filed Dec. 4, 2014, and is a continuation-in-part application of U.S. Ser. No. 14/834,727, filed Aug. 25, 2015, which claims the benefit of Provisional Application No. 62/044,009, filed Aug. 29, 2014, and is a CIP of Ser. No. 14/832,052, filed Aug. 21, 2015, which are all hereby incorporated by reference in their entirety.

BACKGROUND OF THE INVENTION

Field of the Invention

This invention relates in general to the field of optical probes and, in particular, to a novel non-contact interferometric optical probe particularly suitable for coordinate measuring machines (CMMs).

Description of the Prior Art

Coordinate measuring machines are used for measuring the physical geometrical characteristics of an object, typically for quality control purposes in manufacturing and assembly processes. The typical machine takes measurements along three axes (X, Y, Z), orthogonal to each other in a conventional three-dimensional coordinate system. The first horizontal axis (typically the Y axis) is defined by a bridge or gantry supported by two vertical legs coupled to a stationary support table. The second axis, X, is defined by the horizontal motion of the bridge along the support table in the direction normal the first axis (thereby defining an XY plane). The third, Z axis is defined by the vertical motion of a quill or spindle attached to the bridge. A probe is attached to the quill for single-point contact or optical measurements of an object based on a scale system that indicates the location of the probe along each axis. In operation the machine reads the input from the probe as it traces the part at various points and the X,Y,Z coordinates of these points are used to determine size and shape with micrometer precision.

The probe can be mechanical, where the position is established by touching the surface of the object, or non-contact, where the presence of the surface is sensed by observing changes in a particular physical quantity such as reflected light, magnetic field, etc. Mechanical probes require contact with the surface, which in many cases is not desirable, in particular in the measurement of precise optical components.

Many non-contact probes are optics-based. They typically provide good sensitivity but are limited by the amount of light reflected by the tested surface and require proper positioning relative to the surface to achieve optimal sensing conditions. In practice this means that a limited range of surface slopes can be reliably detected, which requires the repeated reorienting of the probe to place it substantially perpendicular to the tested surface, a task that makes the measurement systems less accurate and more complex. Furthermore, the ability to reorient the probe through rotation requires calibration of additional critical parameters in the operation of a coordinate measurement machine, with attendant uncertainties and potential errors.

It is therefore desirable to build a new type of probe capable of accepting a wide range of sensing angles at high accuracy and sensitivity. In this disclosure a new design of optical surface-sensing probe is described that has a large range of acceptance angles and hence can measure a wider range of surface slopes than, and overcome the limitations of, prior-art optical probes. The invention is based on the concepts and teachings disclosed in U.S. Pat. Nos. 8,422,026, 8,810,884 and 8,675,205, hereby all incorporated by reference, combined with a probe structure that enables practical embodiments.

Interference fringes localized relative to a reference surface are used to detect the test surface position. As used herein, "localized fringes" is intended to mean, in the case of low-coherence light sources, interference fringes formed in a limited space around the location where the optical path difference (OPD) between the test and reference beams is close to zero; i.e., where the delay between the reference and test beams is very small. In the case of spectrally-controlled or multiple-wavelength sources, "localized fringes" is intended to mean unambiguously identifiable fringe patterns formed at a predetermined distance from the reference surface. Throughout this disclosure, the word "localized" and related terms are used for convenience to describe the position of interferometric fringes in space in relation to the reference mirror of the interferometer, but it is understood that such fringes are only virtual fringes and that actual fringes are in fact formed on the instrument's detector only when the test surface is located at such "localized" position in space.

SUMMARY OF THE INVENTION

The non-contact optical probe of the invention utilizes an optical reference surface, preferably spherical, that projects a curved test wavefront toward the test surface and detects it by creating interferometric fringes localized in space in front of the reference surface. When the test surface to be measured intersects the location of the fringes, the condition is detected by the probe. Because the fringes are localized at a known position in space, the precise location of the surface (its coordinate with respect to a reference system) can be established to accomplish the measurement.

Such localized fringes can be produced in many different ways; for example, by balancing the optical path difference in an interferometer where the probe is one of the arms (as in conventional white light interferometry—WLI). However, the mechanical requirements for applying a WLI approach to CMMs render the design extremely complex and impractical. Accordingly, the preferred embodiment of the invention is based on the use of a spectrally controllable light source (such as recently disclosed in U.S. Pat. No. 8,422,026) and a probe with diverging or converging Fizeau interferometer configuration because the combination lends itself particularly to a compact and inexpensive design. This should not be construed as a limiting factor, though, because other configurations can be used as well to practice the invention.

As mentioned above, the present state of the art includes contact probes with spherical ball tips, focusing or collimated optical probes, and various data-acquisition approaches. Contact probes have the advantage that they can measure surfaces with measurement angles off the normal direction to the surface, thus enabling the measurement of a wide variety of surfaces; the disadvantage is the necessity to make contact with parts that may be delicate and affected by the contact. Optical probes, on the other hand, are non-contact and allow the measurement of delicate parts; their disadvantage lies in the fact that they must be maintained nearly normal to the measurement surface, thus limiting the range of surfaces that can be measured and increasing the complexity of the instrument and the uncertainty of the measurement.

According to the invention, a new type of optical probe is obtained that affords high non-contact sensitivity and precision in the measurement of various surface types from a wide range of probe positions. The probe is based on sensing and analyzing light reflected off the test object's surface under illumination conditions designed to produce localized interferometric fringes at a predetermined distance from the reference surface. The fringes are produced by optics that ensure a sufficiently large angle of acceptance (i. e., a large numerical aperture) for the probe to capture the fringes produced at locations of high surface slope. For example, a spectrally controllable light source is tuned to produce a modulation peak when the probe is positioned such that the test surface intersects the localized fringes (i. e., when the distance between the test and reference surfaces is equal to the OPD set by spectral modulation of the source). The exact coordinate of the surface point corresponding to such modulation peak is then measured and the process is repeated along the test surface to measure the coordinates of the entire test object. As mentioned above and well understood in the art, when a reference is made for convenience throughout this disclosure to localized fringes formed at a specific distance from a surface (or at an object's surface intersecting localized fringes), the precise intended meaning is that at that surface location the light reflected from the object's surface interferes with the light reflected from the reference surface and forms interference fringes detectable by a suitable device.

In addition to coordinate measurement machines, the probe of the invention is suitable for applications ranging from the precise measurement of optical surfaces with wide slope tolerances to the measurement of roughness and surface profiles in machined elements or engineered surfaces. Various types of probes with converging and diverging wavefronts and examples of their use are described in detail below.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

As used in this disclosure, "white light" is intended to refer to any broadband light of the type used in the art of white-light interferometry, typically having a bandwidth on the order of many nanometers. Such bandwidth may be continuous or amount to a set of discrete wavelengths over the bandwidth, With reference to light, the terms "frequency" and "wavelength" may be used alternatively, as commonly done in the art, because of their well known inverse relationship. "OPD" and "time delay" ($\tau$) are used alternatively because of their space/time relationship in interferometry. The terms "modulate" and "modulation" in connection with a light source refer in the broadest sense to include any alteration of the frequency distribution, amplitude distribution or phase distribution of energy produced by the light source, and the synthesis of a light signal having a desired frequency, amplitude and phase distribution by any means. When used in connection with interference fringes, the term "modulation" refers to the fringe envelope. Localized fringes are described as positioned at the surfaces from which they are produced to illustrate how they relate to those surfaces and surface shapes that produce them; however, it is to be understood that physically the localized fringes actually exist in measurement space at the surface of a detector. Also, the phrase "producing localized fringes at a predetermined position in space" and related expressions are used for convenience, but it is understood that the precise intended meaning is "producing an interferometric environment whereby unambiguously identifiable fringe patterns are produced when a test surface is place at a predetermined position in space" relative to a reference surface. The terms "fringes" and "fringe patterns" are used interchangeably within the meaning normally accorded to them in the art.

Converging- and diverging-beam laser Fizeau interferometers are commonly used to measure reflective surfaces over the entire surface at one time. Such devices use a laser to produce non-localized interference fringes allowing the interferometer to operate in a setup where the optical path difference is not balanced. Such setups cannot be used to locate objects in space because of the periodic and non-localized nature of the interference fringes. In order to locate interference fringes in space, a broad bandwidth or a multi-wavelength light source is required. Normally, such fringes are formed around a location where the optical path difference between the reference and test beams is exactly balanced. Such arrangements have been successfully used for decades as a basis for various shape measuring systems (coherence scanning interferometry or CSI—See Cohen et al. Rough Surface Profiler and Method, U.S. Pat. No.

5,133,601). CSI operation relies on the analysis of the interference-fringe envelope produced by scanning through the measured object—for each point on the surface an interference-fringe pattern is acquired and analyzed. The object shape is determined by finding the location of the peak of the interference envelope (or other conventional methods). For practical reasons CSI devices utilize exclusively planar wavefronts in order to produce a single plane of fringes.

This disclosure describes a probe that enables locating the position of an object surface relative to a designated reference surface by producing in space a predefined distribution of localized fringes. In contrast to CSI, this probe utilizes curved wavefronts in order to increase the probe's angle of acceptance to the degree necessary to detect interferometric fringe patterns produced at surface locations with such high slopes or high roughness that they could not be detected by conventional optical probes. The probe is used to establish the position of a single point on the test surface with the accuracy afforded by the measurement system. Typically the object is not scanned through a fringe envelope, but its position is detected directly by other means, such as by looking at the signal reflected from its surface to provide real time distance of the object from the reference surface or by changing the location of the interferometric fringes in space.

A preferred way to produce localized interferometric fringes is by using spectrally controlled interferometry (SCI) technology. It is particularly suited for this application because it also allows the formation of localized fringes in non-zero OPD conditions, as described in U.S. Pat. No. 8,422,026, thereby affording great flexibility of operation for CMM applications. However, such localized fringes can be established also by other methods and the use of SCI should not be understood as a limiting factor.

The measurement process of the invention involves the following general steps:
1. Producing localized fringes at a predetermined position in space relative to a reference surface. These fringes are preferably located at a predetermined distance away from the reference surface, but could also be formed at the reference surface itself.
2. Positioning the probe of the invention such that a particular single point of interest on the test surface intersects the location where the light reflected from the surface produces the localized fringes.
3. Determining the coordinate of that point on the test surface by analysis of the fringes formed upon reflection of the test wavefront from the test surface.

A coordinate measurement (i. e., a profile or map) of the test surface may then be accomplished by repeating steps 2 and 3 for different points on the test surface so as to produce corresponding localized fringes at the predetermined position in space set in step 1 relative to the reference surface. Alternatively, the coordinate measurement can be accomplished by repeating steps 1 and 3 for different points on the test surface by modulating the light source to produce localized fringes at the various positions in space relative to the reference surface corresponding to the profile of the test surface.

Localization of Fringes.

In addition to a probe that enables the formation of suitable curved fringes, the localization of the fringes is the critical part of the probe operation. Fringes can be localized in space by many means, but the most practical and preferred is through the use of a spectrally controlled source (see U.S. Pat. No. 8,422,026). In such arrangement the source is modulated so as to produce interference fringes at a specified distance from the reference surface (whether it be planar, convex spherical, concave spherical, or other shape). Thus, a predetermined position detectable in space with nanometer measurement precision is created that can be used as an optically equivalent configuration of a physical touch probe.

Figure 1:
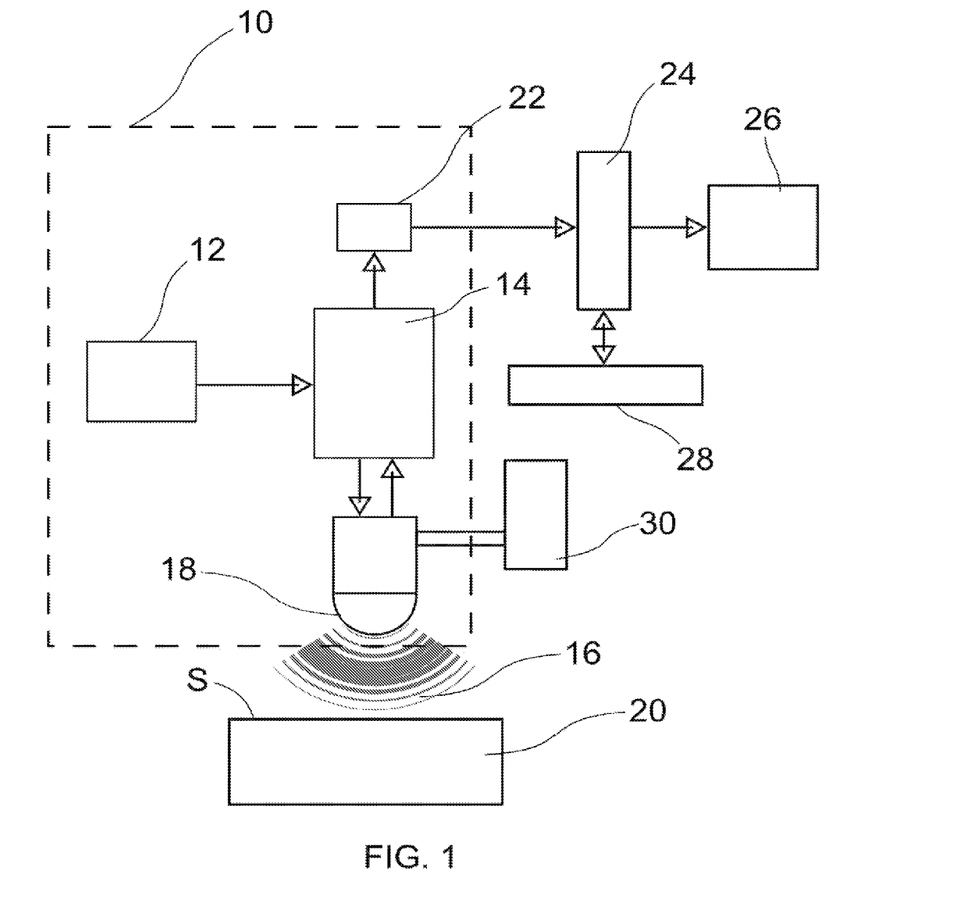
FIG. 1 is a basic schematic illustration of an interferometric probe according to the invention using a divergent wavefront (with respect to the probe) propagating from a spherical convex reference surface. The reference optics of the probe produces the divergent wavefront such that fringes are localized at a specific distance from the reference surface.

In general any suitable reference surface shape can be used in the setup, but, from a practical point of view, spherical surfaces are the most practical (in particular to match existing measurement hardware). The basic schematic of a probe 10 using a divergent wavefront according to the invention is shown in FIG. 1. A light source 12 (preferably of SCI type) supplies illumination to an optical system 14, such as a Fizeau interferometer, used to produce localized fringes 16 at a specific predetermined distance from a reference surface 18, illustrated in this embodiment as a convex spherical surface. A test object 20 is positioned such that the light reflected off its surface S is collected back by the optical system and sent to a detector 22. The signal from the detector is analyzed by conventional fringe analysis using a processor or computer 24 connected to a monitor 26 for visual interaction and control by an operator through an interactive device 28, such as a keyboard or joystick. The computer 24 is programmed to perform fringe analysis by any conventional method to detect the position of a point of interest on the test surface relative to the localized fringes produced by the light source 12. When the probe 10 (or the object 20) is moved in the measurement space by a scanning mechanism 30 to the predetermined position that renders the fringes visible, the detector will register changes in light intensity and a signal corresponding to a fringe pattern parameter, such as modulation, for example, can be used to detect the precise location of the object's surface with respect to a known frame of reference. In the case of a CMM, the frame of reference is the coordinate system to which the machine is associated by calibration.

This type of probe produces a divergent spherical wavefront and the fringes are preferably localized at a relatively small distance from the reference surface 18. The arrangement of FIG. 1 has the advantage of being able to detect a wide range of surface slopes by facilitating the collection of reflected light by virtue of the curved fringes produced by the optics of the probe (i. e., a probe with a large angle of acceptance with respect to the light reflected by the test surface). Also, the same reference surface 18 could be used as a mechanical touch probe in situations where the reflectivity of the surface or its texture does not produce a good-quality optical signal.

Figure 2:
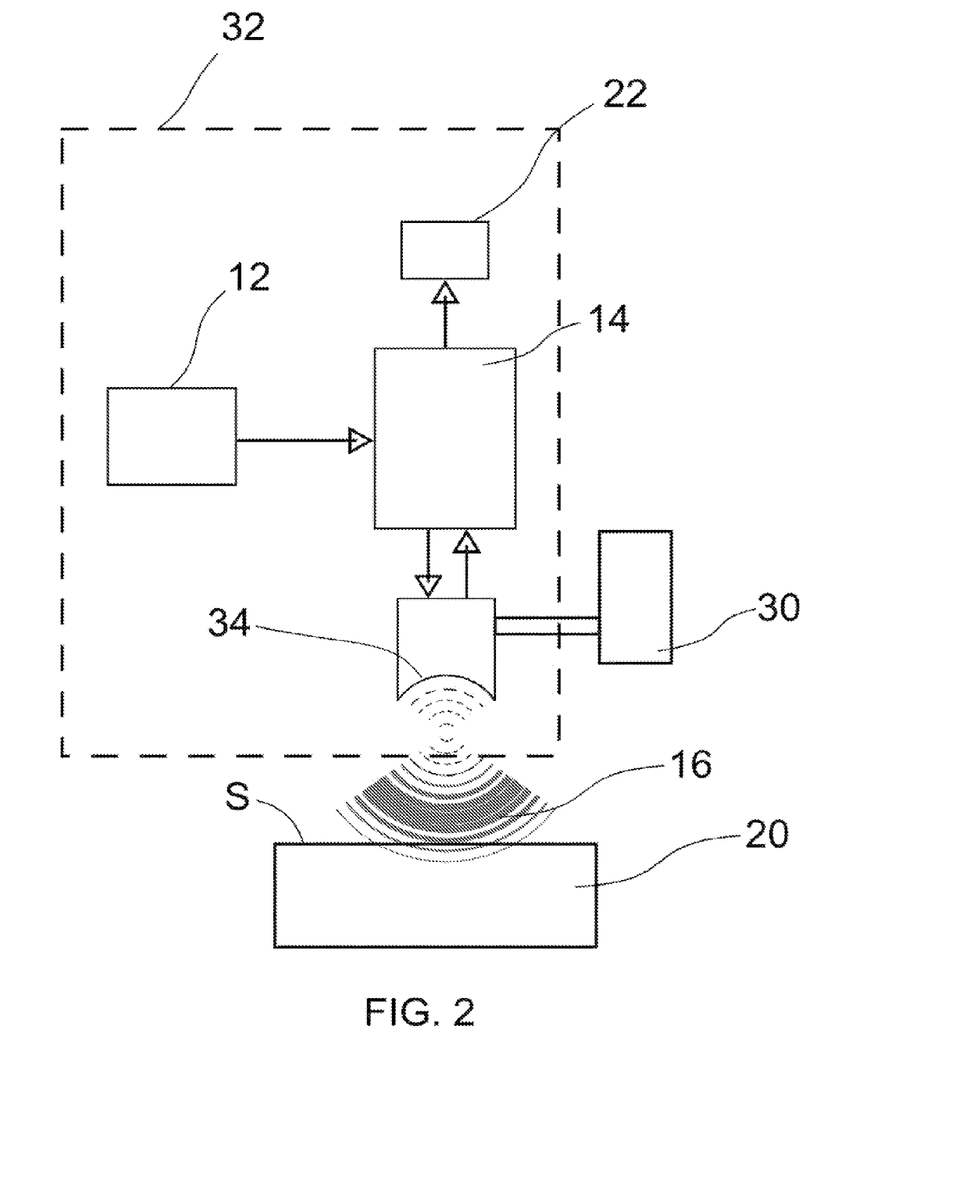
FIG. 2 is a schematic illustration of an interferometric probe with a convergent wavefront (with respect to the probe) propagating from a spherical concave reference surface. The reference optics of the probe produces the wavefront such that fringes are also localized at a specific distance away from the reference surface.

FIG. 2 shows a similar probe arrangement 32 where the localized fringes 16 are referenced to a concave spherical surface 34 emitting a convergent beam. In order to produce convex spherical fringes, this approach requires the fringes to be formed at a larger distance from the reference surface 34 (past the focal point of the convergent wavefront). Note, however, that the radius of the localized fringes (i. e., the distance of the fringe envelope from the focal point) is not tied to the size of the reference surface, but it is simply a function of the distance of the localized fringes from the reference surface of the system. Therefore, the ability to detect small features with a large range of surface slopes can be increased simply by modulating the light source to localize the fringes closer to the focus of the convergent beam.

Figure 3:
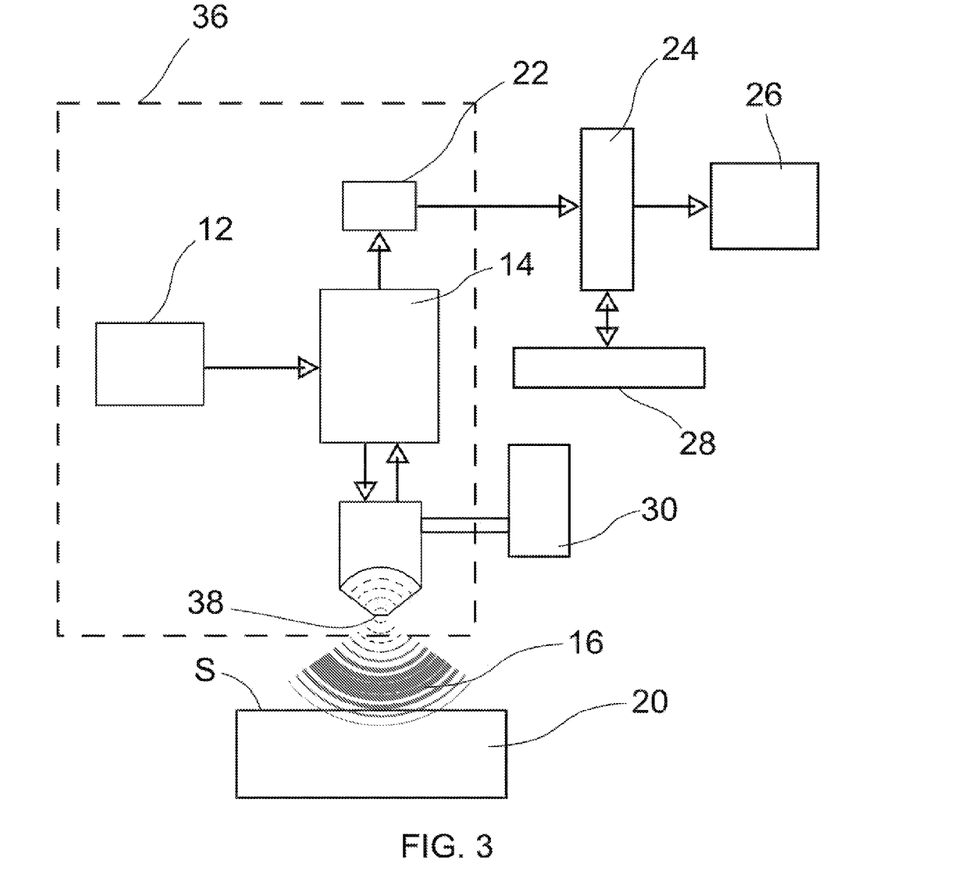
FIG. 3 is a schematic illustration of an interferometric probe with a divergent wavefront (with respect to the probe) propagating from a flat reference surface. The reference optics of the probe again produces the wavefront such that fringes are localized at a specific distance away from the reference surface.

FIG. 3 illustrates a probe 36 where the localized fringes 16 are formed by a divergent wavefront transmitted by a flat surface 38. In order to produce convex spherical fringes in the space in front of the reference flat, this approach requires appropriate optics (not shown) in the objective of the interferometer that produces a test wavefront with the desired divergent curvature. In this arrangement the reference surface is reduced to a very small area, approaching a point, which therefore allows fringe formation with nearly perfect sphericity.

Positioning of Probe.

In order to perform coordinate position or shape measurements, the probe is mounted on a metrology frame to allow it to be moved in space while its position is being monitored and recorded. One such metrology frame can be a set of stages used by coordinate measuring machines, where the probe is attached to a suitable gantry, as described above. A single point at a time is measured by moving the probe toward the test surface until the interference signal is detected and the surface location established. The same procedure can be repeated for a grid of points or, once the probe is "locked" on the surface by finding the localized fringes produced by a surface point, the probe can follow and measure the coordinates of the surface along successive points of localized fringes on a particular line or profile of interest. The combination of the metrology frame and probe data is then used to create a three-dimensional surface map of the part.

Figure 4:
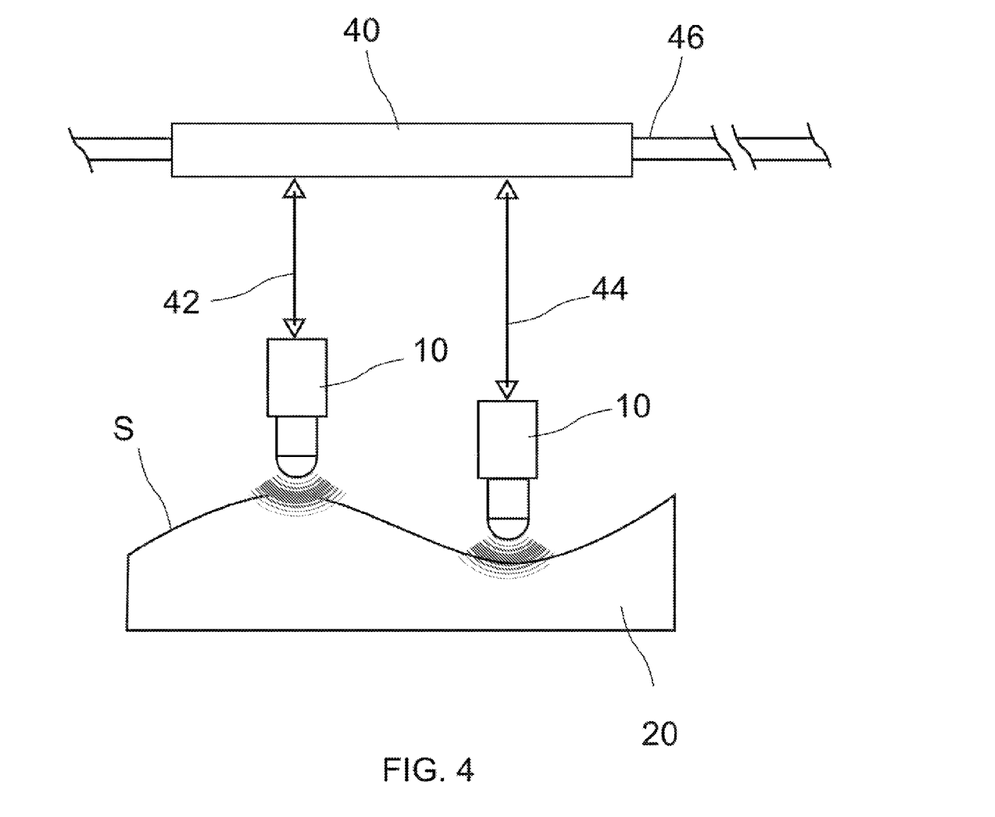
FIG. 4 is a schematic drawing of a surface measurement system using a diverging optical probe to illustrate the measurement of an object by moving the probe and detecting its position at different locations on the surface. The probe can be attached to a metrology frame, such as that of a coordinate measuring machine.

Such a setup is illustrated schematically in FIG. 4, where a probe (such as the probe 10 of FIG. 1, illustrated in less detail), is shown in two measurement positions at two different space locations with the localized fringes locked on the surface of the part 20 under test. An arm 40 of a static metrology frame (such as that of a CMM) is illustrated coupled to the probe. Two locations of the probe 10 detecting the object surface S at positions 42 and 44 relative to the frame are shown schematically for illustration. A lateral translation mechanism 46 is shown schematically for movement of the probe 10 to produce the lateral motion in relation to the test object 20 required to follow a predetermined scanning pattern to profile the test surface S. The probe can be moved while it maintains a "lock" on the surface using the fringes or by repeating the measurement over a discrete grid of points.

Figure 5:
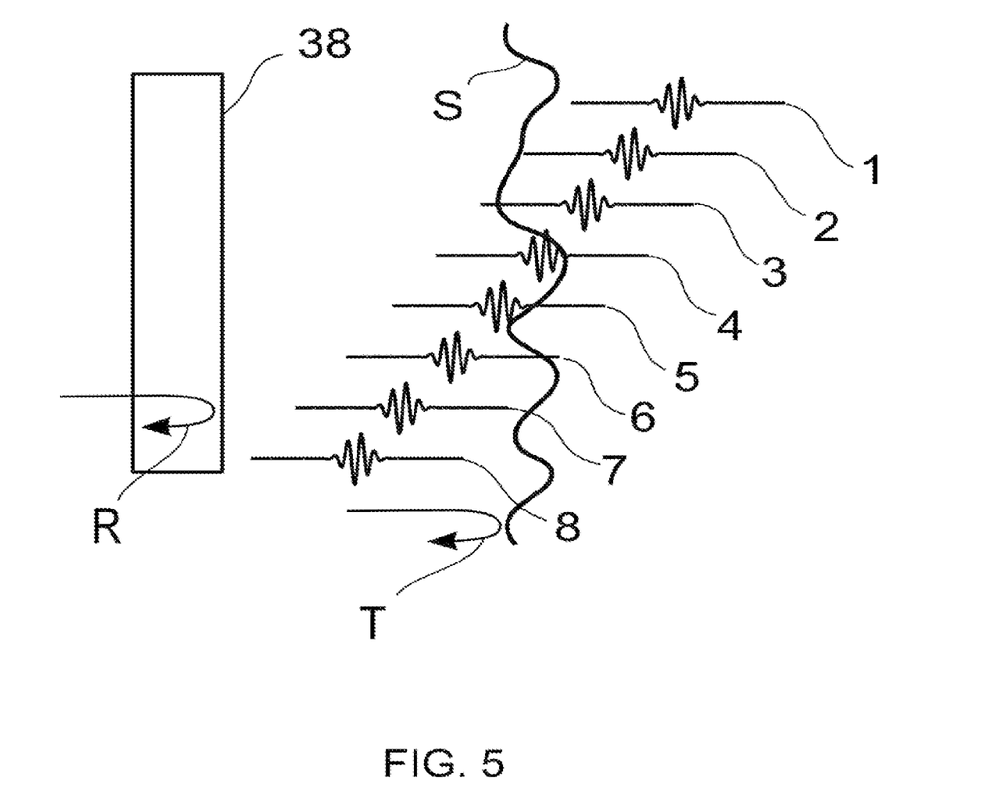
FIG. 5 illustrates an application of the invention wherein the light source is modulated to change the localization of the interference fringes so as to scan though the height of the sample surface to determine the coordinate of a single point on the surface, the interference fringes being shown at the sample surface to illustrate the scanning effect.

Alternatively, the probe could be kept static along a coordinate axis while scanning the surface along a normal direction simply by modulating the light source at each measurement point, as illustrated in FIG. 5. Assume, for example, that a sample surface S is located at a predetermined distance from a flat reference surface 38 of an optical probe coupled to a spectrally controllable light source according to the invention. The spectral distribution is initially modulated sinusoidally as taught in U.S. Pat. No. 8,422,026 to produce fringes with peaks corresponding approximately to locations of the object surface (shown in conventional manner in the figure). By changing the period of the sinusoidal modulation, the value of time delay $\tau$ for which the interference pattern is formed is changed, which is equivalent to the OPD change produced by conventional WLI scanning. The interference fringes produced by reference and test beams R and T, localized in space as illustrated and detected at each step at the detector (i. e., after each change of the period of modulation, illustrated as fringe positions 1-8 in the figure), correspond to the OPD of the light reflected from a particular point on the object and can therefore be used in conventional manner as a means for calculating the coordinate position of the object at that point. As illustrated in FIG. 5, at each measurement point consecutive images are acquired by a camera looking at the object while $\tau$ is progressively changed so as to obtain a sequence of image frames, each of which has a specific value of OPD. Analysis of such data to reconstruct the object's shape can be done with any standard method used in white-light interferometry. Note, however, that this approach is not preferred because of the higher processing time requirements when compared to the approach based on maintaining a "lock" on the surface using the detection of fringes.

Analysis of Interference Signal.

An important part of the detection process is the analysis of the signal reflected from the test surface. Many analysis approaches are well known in the art and a few preferred methods are described below, but any method that enables the measurement of the position of the test surface relative to the fringe pattern produced by the probe is suitable to practice the invention.

The first example is based on moving the localized fringes in space and analyzing the resulting signal, as done conventionally in CSI procedures. The location of the peak of the fringe envelope (or a similar parameter) provides information about the surface position. Therefore, the surface is mapped by moving the probe laterally according to a controlled predetermined scanning pattern (which can be linear, raster, spiral, or any other scan pattern) and finding the location of the fringe envelope at each point, which can be achieved by controlling the spectral properties of the illumination source, as taught in the various SCI patents referenced above. This method has the disadvantage of requiring the full coherence envelope to be acquired prior to analysis, which slows the detection procedure.

An alternative method uses a heterodyne signal, as described in Ser. No. 14/834,727, hereby incorporated by reference. The heterodyne signal can be introduced, for example, by shifting the phase of a sinusoidal modulation of the light frequency. Such detection methods are very accurate and can result in precise measurements. The measurement of the phase of the interferometric fringes combined with the envelope recovery methods can provide information about the location of the tested surface without requiring the acquisition of a full coherence envelope prior to analysis.

Yet another method relies on the ratio of fringe intensities acquired at different spectral bands. For example, in a setup with a large bandwidth of the light source spanning 200 nm, the intensity of the localized fringes can be simultaneously detected using four spectral bands, each having 50 nm bandwidth. By comparing the signals registered at these bands, the information about the absolute surface position can be recovered in a single detector reading. This is possible because each of the spectral bands corresponds to an envelope with a different fringe period. These envelopes have the same phase only at the nominal distance corresponding to the period of the spectrum modulation. Further away from this point the intensity readings at different spectral bands will diverge and this information can be used to establish the location of the surface.

In a typical embodiment of the probe of the invention a single point detector is used to sense the presence of the measured surface. However, it is envisioned that a probe equipped with an imaging system with sufficient quality could be used to image the location of the localized fringes onto an imaging detector such as a camera. Analysis of images from such camera can provide additional information about the location of the object; in particular, it can establish with precision where on the localized fringe envelope the object was detected. Such information can be used to further increase the accuracy of the measurements and enable more sophisticated analysis of an object's shape.

Thus, while the invention has been shown and described herein in what is believed to be the most practical and preferred embodiments, it is recognized that departures can be made therefrom within the scope of the invention. For example, the process of profiling a surface has been described in terms repetitive steps wherein the probe is moved at each step so as to cause the measured point on the test surface to intersect the localized fringes, but it is clear that measurements could be carried out equivalently by moving the test surface in relation to a stationary probe, though this approach would not be practical for CMM applications. A combination of probe and object motions could be implemented in equivalent fashion. Therefore, the invention is not to be limited to the disclosed details but is to be accorded the full scope of the claims, including any and all equivalents thereof.

The invention claimed is:

1. An interferometric measurement method comprising the steps of:
   providing a light source and an interferometric probe configured to project a test wavefront adapted to produce curved localized fringes when a test surface is placed at a predetermined position in space relative to a reference surface;
   determining a position of a single point of interest on a test surface relative to a reference coordinate system by fringe analysis when the point intersects said curved localized fringes; and
   repeating said determining step for a plurality of single points along a predetermined scanning pattern.

2. The method of claim 1, wherein said curved localized fringes are convex.

3. The method of claim 2, wherein said convex localized fringes are spherical.

4. The method of claim 1, wherein said determining step is carried out by moving the probe so as to cause said point on the test surface to intersect said localized fringes.

5. The method of claim 1, wherein said light source is a spectrally controlled light source and said determining step is carried out by spectral sinusoidal modulation of the light source to produce a plurality of localized fringes corresponding approximately to locations of the test surface and by analyzing said fringes to determine which of said localized fringes intersects said point of interest on the test surface.

6. The method of claim 1, wherein said light source is configured to produce a heterodyne signal and said determining step is carried out by analysis of a plurality of localized fringes corresponding to multiple phases of said signal.

7. The method of claim 1, wherein said light source is a multi-wavelength source.

8. The method of claim 1, wherein said is probe is mounted on a coordinate measurement machine.

9. The method of claim 8, wherein said determining step is carried out by moving the probe so as to cause said point on the test surface to intersect said localized fringes.

10. The method of claim 8, wherein said determining step is carried out by sinusoidal modulation of the light source to produce a plurality of localized fringes corresponding approximately to locations of the test surface and by analyzing said fringes to determine which of said localized fringes intersects said point of interest on the test surface.

11. An interferometric measurement system comprising:
    a light source coupled to a test probe, said probe being configured to emit a test wavefront adapted to produce curved localized fringes when a test surface is placed at a predetermined position in space relative to a reference surface of the measurement system;
    a scanning mechanism adapted to place the test surface at said predetermined position in space;
    a computer programmed to perform fringe analysis to detect when the test surface is at said predetermined position in space, said fringe analysis being limited to the detection of a particular, single point of interest of the test surface; and
    a translation mechanism adapted to cause a lateral translation of the probe in relation to the test surface.

12. The system of claim 11, wherein said reference surface is concave.

13. The system of claim 11, wherein said concave reference surface is spherical.

14. The system of claim 11, wherein said light source is a spectrally controllable light source.

15. The system of claim 14, wherein said computer is further programmed to spectrally modulate the light source to produce said curved localized fringes at said predetermined position in space relative to the reference surface.

16. The system of claim 14, wherein said computer is further programmed to modulate sinusoidally the light source to produce a plurality of localized fringes corresponding approximately to locations of the test surface and to process said fringes by fringe analysis to determine which of said plurality of localized fringes intersects said single point of interest on the test surface.

17. The system of claim 11, wherein said light source is configured to produce a heterodyne signal and said computer is further programmed to perform a fringe analysis of a plurality of localized fringes corresponding to multiple phases of said signal.

18. The system of claim 11, wherein said light source is a multi-wavelength source.

19. The system of claim 11, wherein said is probe is mounted on a coordinate measurement machine.

20. The system of claim 19, wherein said computer is further programmed to spectrally modulate the light source to produce said curved localized fringes at said predetermined position in space relative to the reference surface.

* * * * *